Nov. 9, 1926.  
W. A. SHIMP  
1,606,484  
VALVE  
Filed Feb. 23, 1923   2 Sheets-Sheet 2

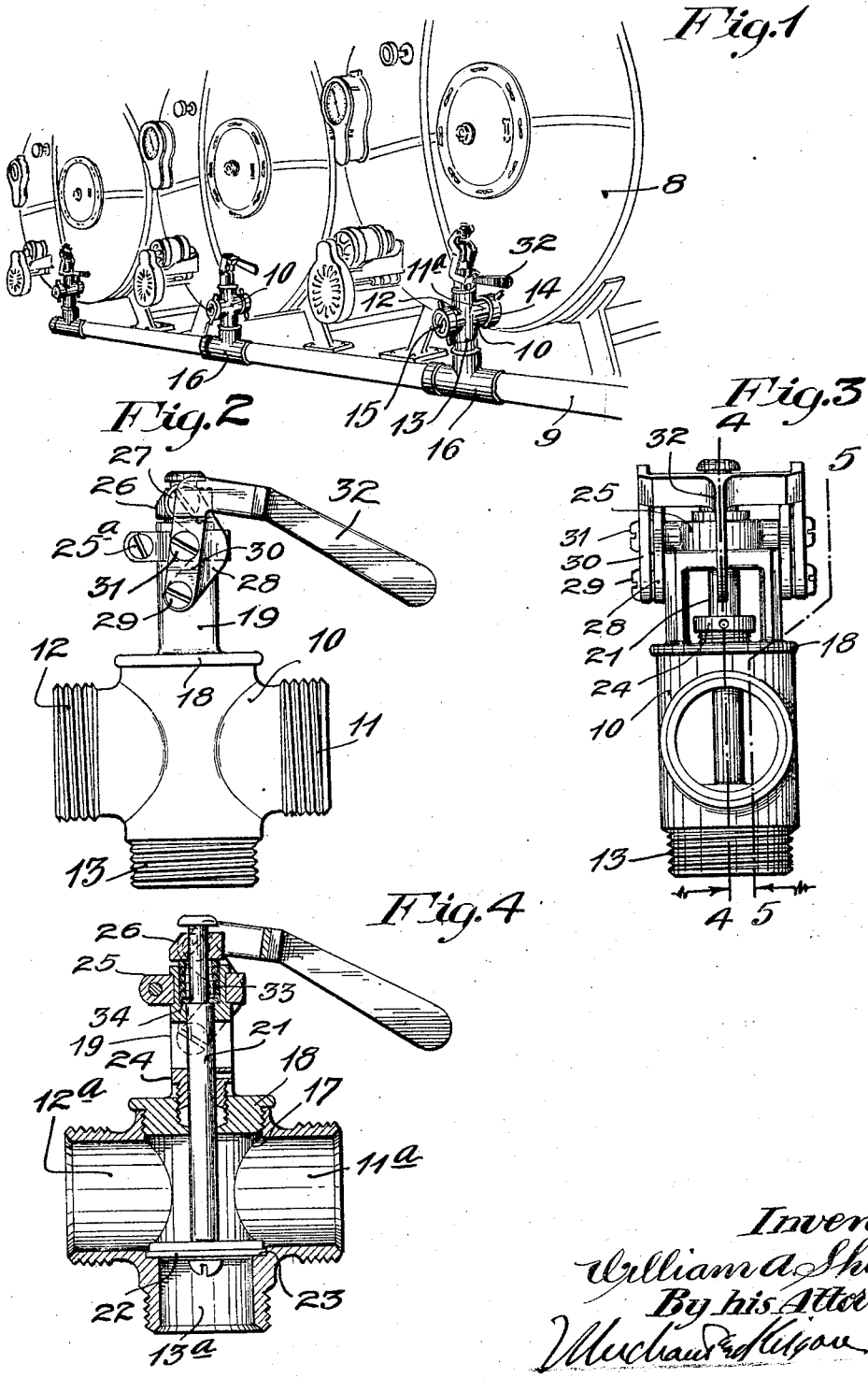

Inventor  
William A. Shimp  
By his Attorneys

Patented Nov. 9, 1926.

1,606,484

UNITED STATES PATENT OFFICE.

WILLIAM A. SHIMP, OF MINNEAPOLIS, MINNESOTA.

VALVE.

Application filed February 23, 1923. Serial No. 620,635.

My present invention provides an improved valve adapted for many uses but particularly adapted for use in couplings between a trunk line and tanks or vats constituting parts of a system for handling milk and cream in creameries. Generally stated, the objects accomplished by this improved valve are simplicity of construction, certainty and quickness of action and a sanitary character due to the absence of inaccessible pockets and with which the valve mechanism may be disassembled for cleaning.

The improved valve has the further important characteristic that, when applied to connect a trunk line pipe to one of a battery of tanks, it permits the tank to which it is connected to be drained and washed while the other tanks are operatively connected to the trunk line pipe.

A commercial form of the improved valve is illustrated in the accompanying drawings, wherein like characters indicate like parts throughout the several views.

Referring to the drawings:

Fig. 1 is a perspective showing several of the improved valves used to connect a common trunk line pipe to a battery or plurality of tanks;

Fig. 2 is a front elevation of one of the improved valves;

Fig. 3 is a side elevation of said valve;

Fig. 4 is a transverse section on the line 4—4 of Fig. 3;

Figure 5:
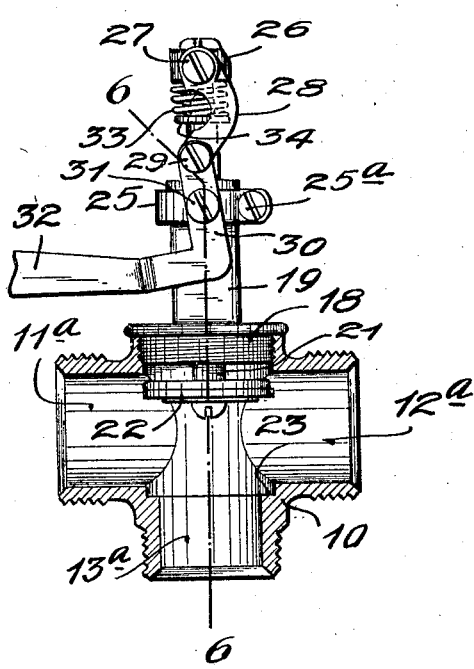
Fig. 5 is a view partly in front elevation, but with the valve casing sectioned on the line 5—5 of Fig. 3 and showing the valve head in a port-opening position.

In Fig. 1, the numeral 8 indicates a plurality or battery of tanks or vats which, so far as this invention is concerned, may be of any suitable form or type but may be assumed to be tanks of the type used for sterilizing milk or cream in creameries. These tanks 8 are individually connected to a common trunk line pipe 9 by my improved valves, the preferred arrangement being as follows:

The valve casing of my improved valve mechanism is in the form of a large, preferably cast metal, T-coupling 10 having externally threaded lateral branches 11 and 12 and an externally depending threaded branch 13. These branches 11, 12 and 13 afford, respectively, an intake port 11ª, a drain port 12ª and a delivery port 13ª. The threaded tubular branches 11 of the several valve casings are connected by unions 14, one to each of the tanks 8. Onto the branches 12 are tightly screwed detachable caps 15 that serve to normally close the drain ports 12ª. The depending branches 13 are connected to T-couplings 16 that are interposed in the trunk line pipe 9.

In its top and in axial alignment with the delivery port 13ª, the valve casing 10 is provided with an internally threaded passage 17 that is normally tightly closed by a plug or cap 18 that affords a base support for a valve stem guide 19. This valve stem guide 19 is preferably cast integral with the base plug 18 and is in the form of two laterally spaced posts connected at their upper ends by an integrally cast head formed with a cylindrical hub 20. Working axially through the base plug 18 and through the hub 20 is a valve stem 21, which, at its lower or inner end, is provided with a disk-like valve head 22 that is adapted to fit a slightly depressed valve seat 23 formed at the inner extremity of the port 13ª. Here it is important to note that this valve head 22 is of slightly less diameter than the base plug 18, so that it is capable of being readily moved axially through the passage 17 when the plug 18 is removed therewith. To form a liquid-tight joint between the base plug 18 and the valve stem 21, a packing gland 24 is axially applied to said plug.

Rigidly clamped but rotatively adjustable on the hub 20 is a lever support or fulcrum in the form of a split collar 25, which, by means of a clamping screw 25ª, may be securely set on said hub.

A cross head 26 is applied to the upper end of the valve stem with freedom for limited sliding movements on the stem. To the opposite ends of the cross head 26, by means of machine screws 27, the upper ends of depending links 28 are pivotally attached. The lower ends of the links 28, by means of screws 29, are pivotally connected to short levers 30, which, by screws 31, are intermediately pivoted to the collar 25. The links 28 and the adjacent free end portions or arms of the levers 30 make up a pair of toggles and, in this preferred arrangement, said arms are formed as the end portions of laterally spaced prongs of a common handle or lever arm 32. The numeral 33 indicates a small coiled compression spring placed around the upper end of the valve stem 21 and compressed between the cross-head 26 and a washer 34, which latter is downwardly pressed against a shoulder on said valve stem but is capable of upward sliding movement thereon. As shown, the hub 20 is recessed so that the washer 34 and spring 33 may be moved downward into the same.

In this specification and in the claims, for the sake of convenience, the valve casing is described as provided with the lateral branches 11 and 12 and the depending branch 13 and the valve operating levers are referred to as located on the top of the valve casing, but, it will, of course, be understood that this is a relative arrangement and that the said valve may be set in any desired position, all within the spirit of the invention as herein disclosed and claimed.

Figure 6:
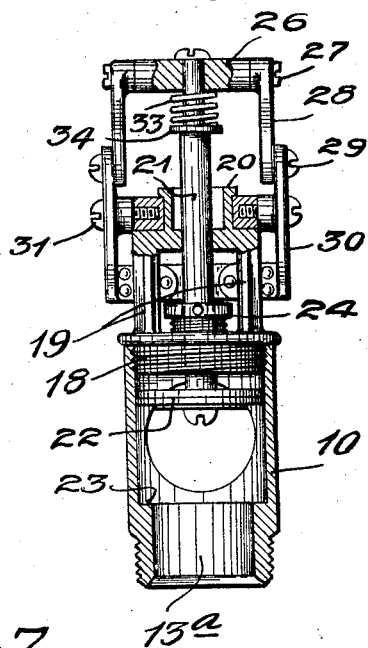
Fig. 6 is a section on the line 6—6 of Fig. 5, some parts being shown in full.

When milk or cream, for example, is to be run from the tanks 8, the valve will be adjusted as shown in Figs. 5 and 6, thereby opening the delivery ports 13ª, and at such time, of course, the drain port caps 15 will be applied. In the said adjustment of the valve, the valve-operating toggles will be slightly past a dead center, as best shown in Fig. 5, so that the valve head and stem will be held against accidental dropping or movement toward port-closing position. When any particular tank is to be drained, other than into the trunk pipe 9, as, for example, when the tank is being washed, the valve head 22 will be moved down to close the port 13ª and the drain port cap 15 will be removed. In this position of the valve head, it is important to note that the spring 33 will be compressed and the toggles will be slightly beyond a dead center, so that the valve head will be locked down in its port-closing position, as best shown in Figs. 2 and 4, by reference to the former of which views, it will be noted that the toggle-forming elements or links 28 are curved or bent to clear the hubs of the lever elements 30. The spring 33 insures tight closing of the valve and eliminates the necessity for close adjustments and also compensates for wear.

From the foregoing, it is evident that any one of the several tanks may be drained without interrupting the flow of milk or cream from the other tanks simply by setting its valve, as shown in Figs. 2 and 4, and by removing the drain cap 15 of that particular valve. It is also obvious that the valve is a quick acting valve. Moreover, the interior of the valve casing has no pockets for the lodgement of liquids and from which the liquid will not flow under the action of gravity.

Figure 7:
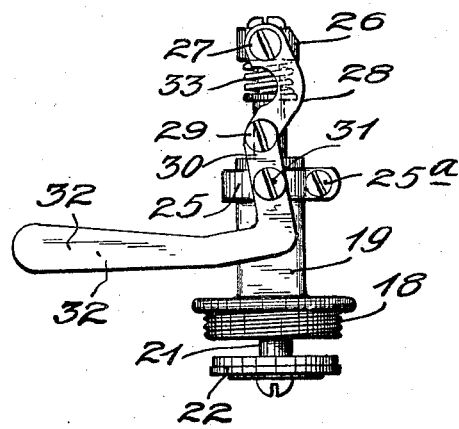
Fig. 7 shows the valve head, its support and operating connections removed from the valve casing.

When the valve is to be cleaned, it is only necessary to unscrew the base plug 18 and then to remove said plug, the valve, the valve head and connected parts, as shown in Fig. 7, and this opens up the valve casing so that it may be readily cleaned. The valve is, therefore, a very sanitary valve.

Another important feature is found in the fact that after the base plug 18 has been screwed down as far as it will go and regardless of the rotative position in which the guide bracket or portion 19 may be set, it is possible quickly and easily to set the lever or handle 32 in any desired position simply by rotatively adjusting the lever-supporting collar 25 on the hub 20.

In actual practice, the efficiency of this valve has been thoroughly demonstrated.

What I claim is:

1. The combination with a valve casing having a laterally projecting port and a depending port, of a plug seated in the top of said valve casing, a valve stem working through said plug and provided with a valve head for closing said depending port, a toggle slidably connected at one end with the outer end of said valve stem and connected at its other end to a part on said plug, a handle for operating said toggle, and a spring in the connection between said toggle and valve stem.

2. The combination with a valve casing having a laterally projecting port and a depending port, of a base plug seated in the top of said valve casing, a valve stem working through said plug and provided with a valve head for closing said depending port, a toggle support rotatively adjustable on said base plug, a cross head slidably mounted on the outer end of said valve stem, a spring connection between said cross head and valve stem, a laterally spaced pair of toggles connecting said cross head to said toggle support, and a common handle connected to corresponding members of said toggles for simultaneously operating the same.

3. The combination with a valve casing having laterally projecting intake and drain ports and a depending delivery port, of a detachable stopper normally closing said drain port, a base plug detachably applied to the top of said casing in alignment with said delivery port, a valve member working through said base plug and having a valve head for opening and closing said delivery port, and means supported by said base plug for operating said valve members including a lever and a yielding connection between said lever and valve member, said yielding connection being compressed when said valve head is seated.

4. The combination with a valve casing having a laterally projecting port and a depending port, of a plug seated in the top of said valve casing, a valve stem working through said plug and provided with a valve head for closing said depending port, a toggle connecting the outer end of said valve stem to a part on said plug, and a handle for operating said toggle, said valve casing being further provided with a drain port and with a detachable stopper normally closing said drain port.

5. The combination with a valve casing having a laterally projecting port and a depending port, of a base plug seated in the top of said valve casing, a valve stem working through said plug and provided with a valve head for closing said depending port, a toggle support rotatively adjustable on said plug, a laterally spaced pair of toggles connecting said valve stem to said toggle support, and a common handle for operating said toggle, and which valve casing is further provided with a drain port and with a detachable stopper normally closing said drain port.

In testimony whereof I affix my signature.

WILLIAM A. SHIMP.